United States Patent

[11] 3,560,824

| [72] | Inventor | Thomas F. Burke<br>North Attleboro, Mass. |
|---|---|---|
| [21] | Appl No. | 781,316 |
| [22] | Filed | Dec. 5, 1968 |
| [45] | Patented | Feb. 2, 1971 |
| [73] | Assignee | Texas Instruments Incorporated<br>Dallas, Tex.<br>a corporation of Delaware |

[54] SPEED CONTROL OF AN ELECTRIC MOTOR EMPLOYING THERMALLY SENSITIVE RESISTANCE
14 Claims, 4 Drawing Figs.

[52] U.S. Cl.................................................. 318/227,
318/229, 318/230, 318/395, 318/399, 318/416
[51] Int. Cl..................................................... H02p 5/40
[50] Field of Search............................................ 318/227,
229, 230, 393, 395, 399, 416, 422

[56] References Cited
UNITED STATES PATENTS

| 3,045,163 | 7/1962 | Collum.......................... | 318/416X |
| 3,108,215 | 10/1963 | Pettit et al. .................... | 318/416X |
| 3,353,078 | 11/1967 | Maynard........................ | 318/227 |
| 3,384,801 | 5/1968 | Rodgers ........................ | 318/227X |
| 3,399,333 | 8/1968 | Canter........................... | 318/227 |

Primary Examiner—Oris L. Rader
Assistant Examiner—Gene Z. Rubinson
Attorneys—Harold Levine, Edward J. Connors, Jr., John A. Haug and James P. McAndrews ABSTRACT: Control apparatus comprising a triac, serially connected to a load such as a motor, is gated through a diac. The diac conducts and turns on the triac during each half cycle of triac current when a capacitor has reached a predetermined charge through a charging resistor having a negative temperature coefficient of resistance. The NTC charging resistor gradually heats up (additional heat can also be supplied) with concomitant decrease in resistance and charge time of the capacitor so that the pulse of current seen by the motor gradually increases until a steady state condition is reached. A heating-cooling system is shown in which the above control is employed with a plurality of thermostats and a safety bypass circuit.

INVENTOR,
Thomas F. Burke,
BY
John G. Haug
Att'y.

3,560,824

SPEED CONTROL OF AN ELECTRIC MOTOR EMPLOYING THERMALLY SENSITIVE RESISTANCE

The present invention relates to motor controls and to the use of thermally sensitive resistances to control the acceleration of an electrical motor during startup.

An object of the present invention is to provide an electrical motor control means which can be made to control the initial speed, the acceleration and the steady state speed of an electrical motor.

Another object of the present invention is to provide a control means for the fan motor of fluid and gas heating-cooling systems which operates in response to the plenum temperature of the system and which controls the initial speed, the acceleration, the steady state speed and the emergency speed of the fan motor.

Other objects, features and advantages of the invention may be best understood by reference to the following detailed description when read in conjunction with the accompanying drawings in which like reference numerals indicate like parts and in which.

Figure 1:
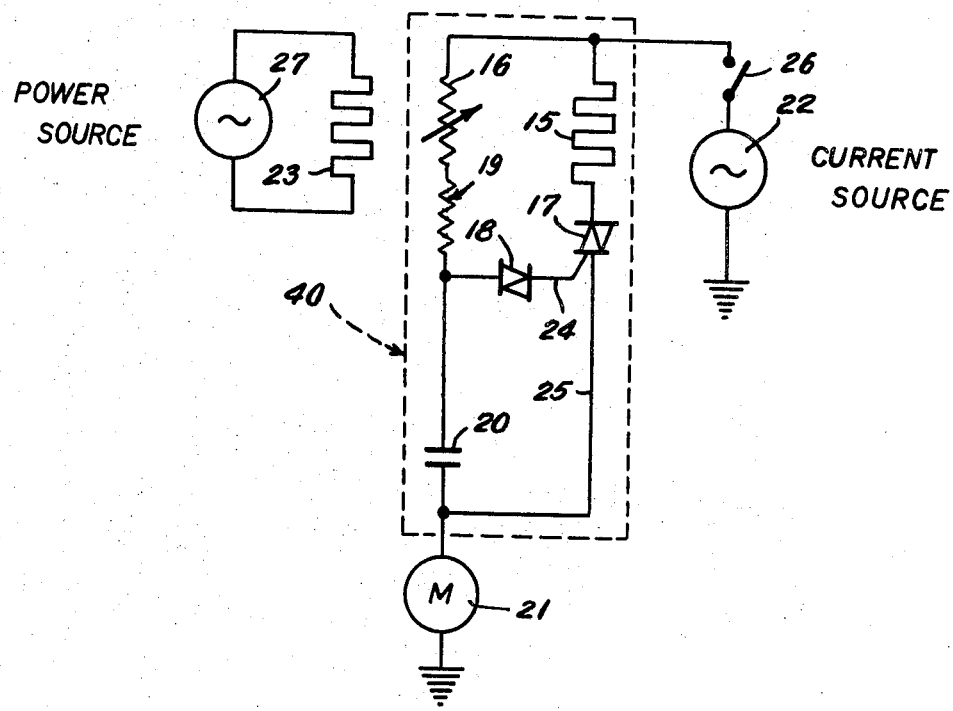
FIG. 1 illustrates a preferred embodiment of the present invention.

Referring to FIG. 1, a preferred embodiment of the present invention is illustrated. Heater element 15 and triac 17 are connected in series between AC power source 22 and induction motor 21. Negative temperature coefficient (NTC) thermistor 16 is connected in parallel with heater element 15 and triac 17 and is in heat transfer relation with heating element 15. Diac 18 is connected in series between thermistor 16 and gate terminal 24 of triac 17. Timing capacitor 20 and resistor 19 are connected in series between thermistor 16 and anode terminal 25 of triac 17. Relay 26 is connected in series with power source 22 and heating element 15.

To illustrate the operation of the embodiment of FIG. 1 assume that relay 26 is open, power source 22 is producing sinusoidal current and voltage, and capacitor 20 is completely discharged, causing diac 18 to have no voltage across it and thus be nonconductive. No gate or anode current flows to triac 17 and thus triac 17 is nonconductive. Thermistor 16 and heating element 15 are both at ambient temperature.

For convenience of description, assume that relay 26 is closed just as the current of power source 22 begins a positive half cycle in its sinusoidal cycle. When relay 26 is closed capacitor 20 begins to charge through thermistor 16 and resistor 19 with the sinusoidal current from power source 22. Triac 17 remains off due to the current blocking effect of diac 18 upon gate terminal 24. When capacitor 20 has charged to a predetermined voltage level, diac 18 is triggered on and conducts in the appropriate current direction. Gate current flows through diac 18 to gate terminal 24 and triac 17 is gated conductive. Triac 17 conducts the line current from power source 22 through heating element 15 and provides driving current for induction motor 21, triac 17 remains conductive and current continues to flow to induction motor 21 until the line current drops below the holding current level required to maintain triac 17 conductive and triac 17 becomes nonconductive. Thus the triac goes nonconductive as the sinusoidal current from power source 22 approaches the end of its first half cycle and the current magnitude approaches zero.

During the portion of the first half cycle in which triac 17 conducts current, capacitor 20 discharges through diac 18. Thus, when triac 17 becomes nonconductive at the end of the half cycle, capacitor 20 is discharged and diac 18 also becomes nonconductive.

As noted above, thermistor 16 is in heat transfer relationship with heating element 15. Thus as the line current flows through heating element 15 and causes its temperature to rise, the temperature of the NTC thermistor 16 also rises causing a decrease in its resistance during the first half cycle due to the heating effect of heating element 15. During this first half cycle, capacitor 20 charges until diac 18 and triac 17 conduct, then discharges while triac 17 conducts.

As the line current enters its second half cycle, a negative one in this case, triac 17 and diac 18 are nonconductive. Capacitor 20 charges with the rising line current, just as it did on the first half cycle. However, the charging rate is increased over that of the first half cycle due to the drop in resistance of thermistor 16. Capacitor 20 charges to the predetermined voltage required to cause diac 18 to conduct and triac 17 to turn on in less time than it did during the first half cycle. Thus triac 17 turns on earlier in the second half cycle than it did in the first and motor 21 receives more current during the second half cycle than it did in the first.

Figure 2:
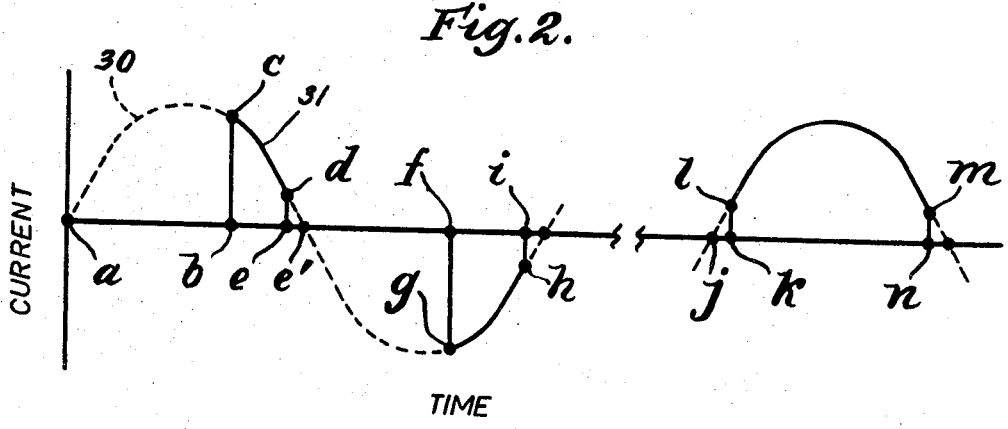
FIG. 2 illustrates a diagram of the current received by the electrical motor of the embodiment of FIG. 1 in relation to the current provided by the power source of the embodiment of FIG. 1.

The process of capacitor 20 discharging, heating element 15 heating up, and the resistance of thermistor 16 decreasing is repeated during this second period of current conduction by triac 17. Thus, when the third line current half cycle begins capacitor 20 charges at an even faster rate than before and triac 17 is turned on earlier than before, and motor 21 will receive more current in the third half cycle than in the first or second half cycle, causing it to speed up. This process of gradual increase of current flow per current half cycle is illustrated in the diagram of FIG. 2. The diagram illustrates the current flow through triac 17 to motor 21 in relation to the current cycle of the power source 22. Curve 30 represents the power source current and curve 31 represents the current conducted by triac 17 to motor 21. Assume that at point $a$ relay 26 is closed. For the time period from point $a$ to point $b$, capacitor 20 is charging to the predetermined voltage sufficient to cause triac 17 to be gated conductive through diac 18. At point $b$, the predetermined voltage is reached and triac 17 turns on. The current conducted by the triac immediately jumps to the full line current, point $c$. From point $c$ to point $d$ triac 17 conducts the full line current until, at point $d$, that line current falls below the holding current level required to maintain triac 17 conductive. At this point the triac 17 goes nonconductive and the current conducted by triac 17 to motor 21 drops to zero, point $e$. From point $e$, when the line current 30 crosses the zero axis, to point $f$, capacitor 20 is again charging to the predetermined voltage sufficient to cause diac 18 to conduct and turn on triac 17. However, capacitor 20 charges at a more rapid rate than it charged between point $a$ and point $b$. The change is due to the decrease in resistance of thermistor 16. Thus the turn on of triac 17 at point $f$ occurs earlier in the second line current half cycle than the turn on at point $b$ occurred in the first half cycle. Triac 17 continues to conduct the line current to motor 21 until, as in the previous half cycle, the current level drops below the holding current level, point $h$, and current conduction ceases, point $i$. The process of causing the triac 17 to go conductive and nonconductive repeats at each half cycle with a continued phase advance of the conducted current as indicated by points $j, k, l, m$, and $n$. A limiting point in the phase advance is reached when the current conducted is a predetermined percentage of the line current. When this limiting point is reached a steady state condition begins with current of the predetermined percentage of line current being conducted each half cycle. As described subsequently, the predetermined percentage will depend upon factors such as the capacitance of capacitor 20, the resistance of resistor 19, the heat transmitted to thermistor 16 and the thermal coefficient and original resistance of thermistor 16.

Figure 3:
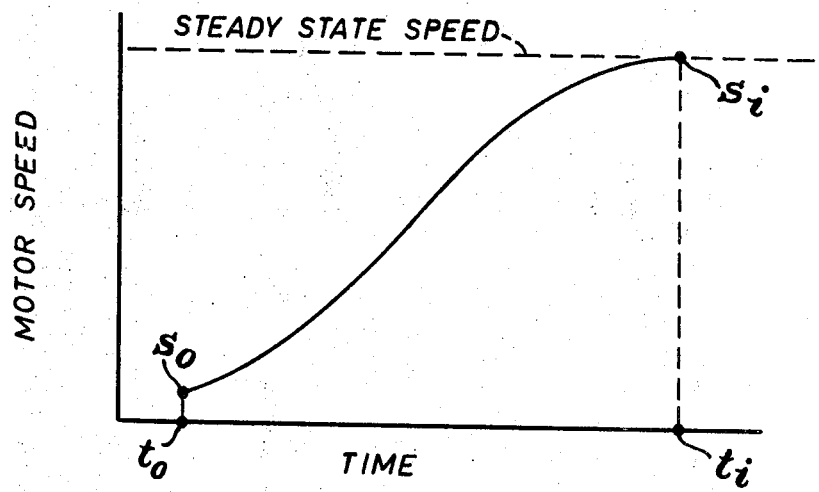
FIG. 3 illustrates a diagram of motor speed plotted against time for a typical operation of the present invention.

The speed of motor 21 is proportional to the current conducted to the motor through triac 17. Thus it is clear from FIG. 2 that the motor speed will start at an initial level and gradually increase until a steady state speed, determined by the maximum current conducted, is reached. The acceleration of an induction motor employing a starter control according to the present invention is illustrated in the diagram of FIG. 3. At time $t_0$ the first current pulse starts the motor and the motor almost immediately attains an initial speed, $s_0$. The speed continues to increase at a predetermined acceleration until a predetermined steady state speed, $s_i$, is achieved at $t_i$.

Referring again to FIG. 1, the means for providing heat to thermistor 16 in addition to the heat generated in heating element 15 can be an external heating element 23 and power source 27. Thus, if desired, the rate of increase in current conduction and resultant rate of increase in motor speed can be selectively controlled by control of the current through heating element 23. When heating element 15 is used, the acceleration of the motor 21 can be adjusted by adjusting the relationship between the current flowing through heater element 15 and the resistance of thermistor 16. This can be accomplished by adjusting the thermal interaction of heating element 15 and thermistor 16, by adjusting the heat produced by element 15 per unit of current flow and by adjusting the temperature-resistance relation of thermistor 16. These means of control can be used separately or in combination to achieve the desired acceleration.

Both the initial speed and the steady state speed of motor 21 are controlled by the choice of thermistor 16, resistor 19, capacitor 20 and diac 18. The choice of the magnitudes of the initial resistance of thermistor 16, the resistance of resistor 19, the capacitance of capacitor 20, and the conduction voltage of diac 18, determine the initial motor speed. The choice of the magnitude of the temperature coefficient of thermistor 16, the resistance of resistor 19, the capacitance of capacitor 20 and the conduction voltage of diac 18 determine the steady state speed of the motor. If desired, a variable resistor can be substituted for resistor 19 and initial and steady state motor speeds can be selected as operating conditions require.

Effective control of motor acceleration is especially beneficial in applications in which the noise of a starting motor may be objectionable. By controlled, slow acceleration, noise change due to acceleration of the motor can be kept below the 1 decibel/second rate which is generally accepted as the lowest rate of noise change perceptible to the human ear. Control of the acceleration rate also allows the motor to be accelerated rapidly through the low-speed, high-heat-producing ranges and aids lubrication of bearings.

Because of the current pulse method of speed control, the embodiment of FIG. 1 is most efficient when used with split capacitor or shaded pole induction motors. However, its advantageous use is not limited to these types of motors. The embodiment can be effectively used with any motor which can be started and accelerated by increasingly long current pulses. It is within the purview of the invention to employ the embodiment of FIG. 1 whenever gradually increasing current pulses are required, whether to drive a motor or for any other use.

Figure 4:
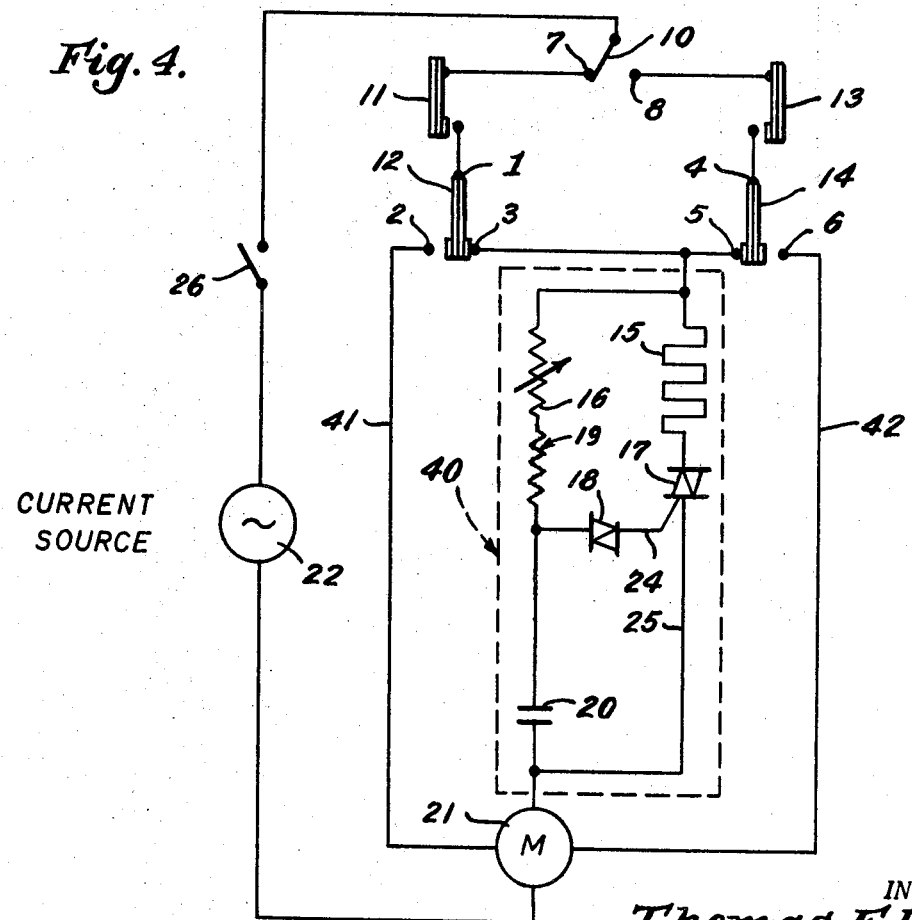
FIG. 4 illustrates another embodiment of the present invention.

Referring to FIG. 4, an embodiment of the present invention is illustrated which is especially suited for use in heating-cooling of air. The invention provides motor control for the fan induction motor of such heating-cooling systems. Switch 10 is a two position switch placed in series with power source 22 and heating element 15. It is positioned depending on whether the system is being used to heat or cool. When the system is used to heat contact 7 is closed, when the system is used to cool contact 8 is closed. Relay 26 serially connected with power source 22 and motor 21 controls the power flow to the circuit 40. Thermostats 11 and 12 are placed in series between contact 7 of switch 10 and heating element 15. Thermostats 13 and 14 are placed in series between contact 8 of switch 10 and heating element 15. Thermostats 11, 12, 13 and 14 control the off-on state of circuit 40 in accordance with the plenum air temperature of the heating-cooling system. Thermostats 11 and 13 are single position thermostats. The contacts of thermostat 11 close on sufficient rise in temperature while the contacts of thermostat 13 open on sufficient rise in temperature. Thermostats 12 and 14 are two position thermostats. Thermostat 12 can be in contact position 1—2 or in contact position 1—3, thus able to conduct current from point 1 to point 2 or from point 1 to point 3, respectively. Similarly, thermostat 14 can be in contact position 4—5 or in contact position 4—6, thus able to conduct current from contact 4 to contact 5, or from contact 4 to contact 6, respectively. Which contact positions thermostats 12 and 14 are in is determined by the plenum air temperature of the heating cooling system. Conduction line 41 connects contact 2 of thermostat 12 to motor 21 while conduction line 42 connects contact 6 of thermostat 14 to motor 21. Thus, when thermostat 12 is in the 1—2 contact position or when thermostat 14 is in the 4—6 contact position, a direct current path bypassing heating element-thermistor circuit 40 is set up between thermostats 12 or thermostat 14 respectively to motor 21.

To illustrate the operation of this embodiment, assume that the heating-cooling system is to be operated in the heating mode. Switch 26 is closed energizing the system and switch 10 is placed in the contact 7 position. Thermostat 12, as noted above, can be in either the 1—2 or 1—3 position. For plenum temperatures above a predetermined value, for example, 105° F., it is in the 1—3 position. Thermostat 11 is normally in the open position. When the plenum air temperature of the system rises to a second predetermined value, for example 120° F., thermostat 11 closes. Thus, when the plenum temperature, heated by the heat source and heat exchanger, rises above 120° F. thermostat 11 is closed and thermostat 12 is in the 1—3 position. Current from AC power source 22 flows through thermostats 11 and 12 to the heater-thermistor circuit 40. With current being conducted to it, the heater-thermistor circuit 40 functions as described in conjunction with the operation of the embodiment of FIG. 1. The current from the power source 22 is conducted to motor 21 by triac 17 in gradually increasing pulses until a predetermined steady state current pulse and a predetermined motor speed are attained. The system fan driven by the motor 21 thus moves plenum air through the system at a gradually increasing rate until a steady state air flow is attained. The steady state operation will continue until either relay 26 is opened blocking current flow, or the plenum air temperature drops to a third predetermined value, for example 110° F., indicating that the heat source has been turned off. At that temperature thermostat 11 opens and current flow is blocked.

However, if during operation of the system, the plenum air rises to a fourth predetermined temperature, for example 145° F., indicative of an undesirable, high heat exchanger temperature, thermostat 12 changes to the 1—2 contact position. In the 1—2 contact position current from power source 22 is conducted directly to fan motor 21 via conductor 41. Fan motor 21 is thus immediately accelerated to its maximum speed to cause the most rapid plenum circulation possible, helping to prevent a continuation of the heat build up around the heat exchanger. This emergency motor acceleration is especially important where there is possibility of failure of the heat source control which causes more heat to be generated than the heat exchanger and circulation system can handle at normal fan speeds.

The operation of the invention when the heating-cooling system is in the cooling mode is similar to that described for the system in the heating mode. Switch 10 is placed in the contact 8 position. Thermostat 13 closes when the plenum air temperature drops to a predetermined temperature, for example 60° F. Thermostat 14 closes to the 4—5 position when the plenum temperature drops to, for example, 70° F. With motor 22 on, relay 26 closed, thermostat 13 closed and thermostat 14 in the 4—5 position, current is conducted from power source 22 to heating element-thermistor circuit 40. Current pulses of gradually increasing magnitude are conducted to fan motor 21 and the fan it drives gradually accelerates to a steady state speed.

If the plenum air drops to a temperature indicating an undesirable low heat exchanger temperature, for example 40° F., thermistor 14 changes from the 4—5 to the 4—6 position. Maximum current is thus conducted to motor 21 via conductor 42 and motor 21 is immediately accelerated to maximum speed. The fan is thus caused to circulate the plenum air at a maximum rate, helping to provide heat to the heat exchanger and alleviate the undesirable low temperature condition.

The embodiment of the invention illustrated in FIG. 4 provides a quiet, slow start for the fan motor 21 of the heating-cooling system. It provides controlled motor acceleration with the choice of initial and steady state speeds. It minimizes thermal stresses on the system heat exchanger through slow fan motor acceleration. The plenum temperature sensitive control of thermostats 11, 12, 13 and 14 insures that plenum air is not circulated until it is the proper temperature. The thermostatic control also insures that undesirable heat exchanger temperatures are effectively and rapidly corrected.

It is to be understood that the above described embodiments are merely illustrative of the present inventions. Other arrangements may be devised by those skilled in the art without departing from the spirit and scope of the invention as defined in the appended claims.

I claim:

1. In an AC power source electrical motor system, a motor start up acceleration control system comprising first means for conducting current to the motor from the power source, said first means having a conductive state and a nonconductive state, second means for causing said first means to be conductive for a portion of each power source current half cycle and nonconductive for a portion of each power source half cycle, a feedback means for producing a feedback signal proportioned to the portion of each current half cycle during which the first means is in the conductive state, said second means receiving said feedback signal of said feedback means in response thereto causing the portion of each half cycle during which the first means is in the conductive state to be of longer duration than the portion of the previous half cycle during which the first means was in the conductive state, said feedback means comprising a heating element through which current flowing to the motor must pass, said current element producing a quantity of heat proportioned to the flow of current through it during each power source current half cycle, the quantity of heat so produced being the feedback signal of the feedback means, and wherein the second means includes a thermally sensitive element for receiving said feedback signal of said feedback means whereby said motor is caused to receive current pulses of gradually increasing duration each power source current half cycle and the motor speed is thereby caused to accelerate.

2. The motor startup acceleration control system defined in claim 1 wherein the first means comprises a gated semiconductor device connected in series between the AC power source and the motor and having its gate terminal connected to the second means such that the gate current flowing to the gate terminal of the gated semiconductor device is controlled by said second means.

3. The motor startup acceleration control system defined in claim 1 wherein the second means includes a charging capacitor, said capacitor causes the first means to be in the conductive state when said capacitor has charged to a predetermined level; said capacitor charges from the power source current at a rate proportional to the feedback signal of the feedback means during the portion of each power source current half cycle when the first means is in the nonconductive state, said capacitor discharges during the other portion of each power source current half cycle.

4. The motor startup acceleration control system defined in claim 4 wherein said first means comprises a triac connected in series between the AC power source and the motor and wherein said second means includes a diac having one terminal connected to a terminal of said capacitor of said second means, and having the other terminal connected to the gate terminal of said triac of said first means, whereby, when said capacitor charges to the voltage level required to cause said diac to conduct, said diac enters the conductive state and conducts gate current to said triac, causing said triac to enter the conductive state.

5. In an AC power source load system, a current control means comprising a triac placed in series between the power source and the load, first means for producing an output signal proportioned to the duration of current flow through the triac during each current half cycle of the power source, second means responsive to the output signal of the first means and to the current cycle of the power source for controlling the conductive nonconductive states of the triac during each current half cycle of the power source, the first means includes a heating element through which the current which flows through the triac must pass, the heat generated by the heating element being proportioned to the duration of the current flow through the triac during each power source half cycle, and the heat generated by the heating element comprises the output signal of the first means whereby a current pulse is caused to be conducted to the load at each current half cycle, the current pulse having a duration in accordance with the power source current cycle and said output signal of the first means.

6. The current control means defined in claim 5 wherein the second means includes a thermally sensitive element for receiving the output signal of the first means.

7. In an AC power source electrical motor system, a motor startup acceleration control system comprising a heating element and a triac connected together in series and connected in series between the power source and the motor, the heating element connected to the power source and producing a quantity of heat proportioned to the current flowing through it; the triac connected to the motor the conductive nonconductive state of the triac controlling the flow of current to the motor from the power source; a negative temperature coefficient thermistor, a resistance and a capacitor connected in series together and connected in parallel across the heating element and the triac; the thermistor connected to the terminal of the heating element which is connected to the power source and the capacitor being connected to the anode terminal of the triac which is connected to the motor; the thermistor being in intimate thermal contact with the heating element, and having its resistance proportioned to the heat produced by the heating element, the capacitor charging through the thermistor and the resistance when the triac is in the nonconductive state, and discharging when the triac is in the conductive state, a diac having a first terminal connected to a point between the resistor and the capacitor and having a second terminal connected to the gate terminal of the triac; the conductive nonconductive state of the diac controlling the flow of gate current to the triac, the triac being caused to enter the conductive state when a voltage of a predetermined magnitude occurs at its first terminal, whereby, during each power source current half cycle, the capacitor charges through the thermistor and resistor at a rate determined by the resistance of said thermistor and resistor from a voltage level below that required to cause the diac to become conductive to the predetermined voltage level, causing the diac to become conductive and conduct gate current to the triac, the triac becomes conductive and conducts current from the power source to the motor for the remainder of the current half cycle until the conducted current falls below the holding current of the triac and the triac and the diac become nonconductive; the capacitor discharges through the diac and triac while the triac is conductive and the heating element produces heat, causing the resistance of the thermistor to change in inverse proportion to the change in heat produced by the heating element and causing the charging rate of the capacitor to be altered in accordance with the change in thermistor resistance; causing current pulses of gradually increasing duration to be conducted by the triac to the motor, the pulses having a predetermined initial duration, a predetermined rate of duration increase and a predetermined limiting steady state duration, and causing the motor speed to be accelerated from a predetermined initial speed to a predetermined steady state speed at a predetermined acceleration.

8. In a system for circulating a fluid or a gas of a predetermined temperature range including an AC power source, a fan for circulating said fluid or gas, and a motor for driving said fan, a fan motor acceleration control system comprising, first means responsive to the temperature of the fluid or gas for enabling or blocking current flow from said power source to said motor, second means for controlling current flow to said motor from said power source when said first means enables said current, said second means having a conductive state and a nonconductive state, third means for controlling the conductive and nonconductive states of second means and for causing second means to be conductive for a portion of each power source current half cycle for which said first means has enabled current flow, and causing said second means to be nonconductive for a portion of each such power source current half cycle, a feedback means for producing a feedback signal proportioned to the portion of each current half cycle during which said second means is conductive, said third means receiving said feedback signal and in response thereto causing the portion of each current half cycle during which said second means is in the conductive state to be of longer duration than the portion of the previous half cycle during which said second means is in the conductive state, said third means continuing to cause such increases in duration of conductivity of said second means until a predetermined steady state duration of conductivity is attained, whereby said fan motor and said fan are caused to accelerate from a predetermined initial speed to a predetermined steady state speed at a predetermined acceleration.

9. In a heating-cooling system for circulating a fluid or gas of a first temperature range or of a second, lower, temperature range including an AC power source, a fan for circulating said fluid or gas and an electrical fan motor for driving said fan, a fan motor current control system comprising first means for regulating the flow of current to said fan motor from said power source, said first means controlling the acceleration and speed of said fan motor, second means for controlling current flow from said power source to said motor when fluid or gas of said first temperature range is to be circulated, said second means causing current flow to said motor to be regulated by said first means when the temperature of said fluid or gas is within said first temperature range, said second means also causing current flow to said fan motor to be blocked when the temperature of said fluid or gas is below said first temperature range and causing said current to bypass said first means and flow directly to said fan motor when the temperature of said fluid or gas is above said first temperature range, third means for controlling current flow from said power source to said motor when fluid or gas of said second temperature range is to be circulated, said third means causing current flow to said fan motor to be regulated by said first means when the temperature of said fluid or gas is within said second temperature range, said third means also causing current flow to said fan motor to be blocked when the temperature of said fluid or gas is above said second temperature range, and causing said current to bypass said first means and flow directly to said fan motor when the temperature of said fluid or gas is below said second temperature range, fourth means for causing said current to be controlled by said second means when fluid or gas of said first temperature range is to be circulated and causing said current to be controlled by said third means when fluid or gas of said second temperature range is to be circulated.

10. The fan motor current control system defined in claim 9 wherein said first means comprises conductive means for conducting current to the motor from the power source, said conduction means having a conductive state and a nonconductive state, control means for controlling the conductive nonconductive states of said conduction means in such a manner that said conduction means is conductive for a portion of each power source current half cycle and nonconductive for a portion of each power source current half cycle, feedback means for producing a feedback signal proportional to the portion of each current half cycle during which said conduction means is in the conductive state, said control means receiving said feedback signal of said feedback means and in response thereto causing the portion of each half cycle during which said conduction means is in the conductive state to be of longer duration than the portion of the previous half cycle during which said conduction means was in the conductive state until a predetermined duration of conductance is attained and then continuing to cause said conduction means to be conductive for said predetermined proportion of each subsequent power source current half cycle, whereby said fan motor and fan are caused to accelerate from a predetermined initial speed to a predetermined final speed at a predetermined acceleration.

11. The fan motor current control system defined in claim 9 wherein said second means comprises a first thermostatic means for controlling current flow from said power source to said fan motor, said first thermostatic means enabling said current flow when the temperature of said fluid or gas is above the lowest temperature of said first temperature range and blocking said current flow when the temperature of said fluid or gas is below said lowest temperature of said first temperature range, a second thermostatic means for controlling current flow from said first thermostatic means to said first means and to said fan motor, said second thermostatic means enabling current flow from said first thermostatic means to said first means when the temperature of said fluid or gas is within said first temperature range, and causing said current flow to bypass said first means and flow directly to said motor when said fluid or gas temperature is above said first temperature range.

12. The fan motor current control system defined in claim 11 wherein said first thermostatic means comprises a first current conducting thermostat connected in series between said power source and said fan motor, said first thermostat having a conductive and a nonconductive state dependent upon the temperature of said fluid or gas, and said second thermostatic means comprises a second current conducting thermostat connected in series between said first thermostat and said first means, and between said first thermostat and said fan motor, said second thermostat having a first and a second conductive state dependent upon the temperature of said fluid or gas, said first conductive state conducting current to said first means from said thermostat and said second conductive state conducting current to said fan motor from said first thermostat.

13. The fan motor current control system defined in claim 9 wherein said third means comprises a third thermostatic means for controlling current flow from said power source to said fan motor, said third thermostatic means enabling said current flow when the temperature of said fluid or gas is below the highest temperature of said second temperature range and blocking said current flow when said fluid or gas is above said highest temperature of said second temperature range, a fourth thermostatic means for controlling current flow from said third thermostatic means to said first means and to said fan motor, said fourth thermostatic means conducting current from said third thermostatic means to said motor when said fluid or gas temperature is within said second range and causing said current flow to bypass said first means and flow directly to said motor when said fluid or gas temperature is below said second temperature range.

14. In an AC power source electrical motor system, a motor speed control system comprising conduction means including a gated semiconductor device connected in series between said power source and said motor current and control means for controlling the conductive nonconductive state of said semiconductor device to cause current pulses of predetermined durations to be conducted to said motor corresponding to predetermined motor speed and accelerations, said control means comprising a capacitive means for causing gate current to flow to said gated semiconductor device to control the conductive, nonconductive state of said device, heat producing means comprising a second power source, a heating element connected across said second power source, and a negative temperature coefficient thermistor thermally intimate to said heating element, said capacitive means charging through said thermistor.